United States Patent Office 3,671,189
Patented June 20, 1972

3,671,189
TREATMENT OF PHOSPHATE ROCK WITH ACIDS
Anson G. Betts, Plainfield, Mass.
(West Cummington, Mass. 01026)
No Drawing. Continuation-in-part of application Ser. No. 361,207, Apr. 20, 1964, which is a continuation-in-part of application Ser. No. 153,741, Mar. 20, 1961, which in turn is a continuation-in-part of application Ser. No. 768,554, Oct. 21, 1958. This application June 16, 1966, Ser. No. 559,371
Int. Cl. C01b 25/22; C01f 7/50
U.S. Cl. 23—88
10 Claims

ABSTRACT OF THE DISCLOSURE

Phosphate rock is decomposed by treatment with solution of acid selected from the group of acids named in the specification, using a proportion of acid sufficient to substantially complete the decomposition of the calcium fluophosphate of the used portion of the phosphate rock. There is provided and used in the acid treatment of the phosphate rock a reacting compound of aluminum used in the proportion stated in the specification, with the result that the fluorine of the treated phosphate rock chemically reacts and combines with aluminum of the used compound of aluminum to form a compound of aluminum and fluorine. Separate compounds of (1) substantially fluorine-free artificial phosphate and (2) of aluminum-fluorine compound result, which may be recovered separately in an artificial phosphate product and a solid fluoaluminate product.

Sulphurous acid formed when a stream of gas from combustion of a sulphur-containing substance is brought into an aqueous solution, may be used as the acid of treatment of phosphate rock, myself having discovered that while phosphate rock is refractory toward so-obtained sulphurous acid, phosphate rock is chemically decomposable by such solution of sulphurous acid containing a reactable aluminum compound. As a result of my discovery the recovery and utilization of sulphur dioxide from gas streams resulting from the burning of sulphur-containing substances is made practical and useful. New and useful phosphate products result from the use of my said discovery.

---

This application is a continuation-in-part of my earlier application Ser. No. 361,207 filed Apr. 20, 1964 and, subsequently thereto abandoned. Division of application number 361,207 was required and in compliance thereto said application number 361,207 was divided and instead two continuation-in-part applications were filed, namely this application Ser. No. 559,371 and application Ser. No. 557,887, both filed June 16, 1966. Application Ser. No. 361,207 was a continuation-in-part of my earlier-filed application Ser. No. 153,741 filed March 20, 1961 and said application Ser. No. 153,741 was a continuation-in-part of my still earlier filed application Ser. No. 768,554 filed Oct. 21, 1958. The said applications Ser. Nos. 768,554, 153,741 and 361,207 were subsequently abandoned. As to subject matter common to all of said prior applications, but excepting application Ser. No. 557,887, and common to this application, the benefit of the filing dates of the said prior applications, excepting said application Ser. No. 557,887, is claimed. The benefit of the filing date of said application Ser. No. 361,207 is claimed.

This invention relates to the treatment of phosphate rock with acids. In this invention phosphate rock, which may be raw phosphate rock, phosphate rock concentrate, apatite concentrate etc., optionally pre-calcined before use, and preferably finely powered before use, is treated with aqueous acid of the group of acids which consists of monobasic nitric, hydrochloric, perchloric, amidosulphonic (sometimes trade-named "sulfamic"), and of alkyl-sulphuric acids (resulting from absorption of ethylene, propylene or butylene in strong sulphuric acid), and of dibasic sulphuric and sulphurous acids. Mixed acids selected from the above group of acids may be employed.

Examples of products from use of the invention are (1) solution of phosphoric acid, (2) solution of phosphoric acid and calcium salt of acid of treatment, and (3) solid fluoaluminates of sodium, calcium, potassium and ammonium.

In the practice of the invention, the acid solution used to treat the phosphate rock etc. is provided to contain an aluminum salt, preferably provided and used in the herein-below proportions, using the solution applied to the phosphate rock with the effect of chemically decomposing the phosphate rock liberating phosphoric acid, converting at least the greater part of the fluorine of the treated phosphate rock and of the aluminum of the provided aluminum salt to a compound of aluminum and fluorine, and converting at least a substantial part of the calcium of the phosphate rock to calcium salt of acid of treatment.

Phosphate rock often contains from about 3 to about 4 percent of fluorine, valuable if recovered in a separate commercially-usable product. In the prior art of treatment of phosphate rock with acids much of the fluorine has been lost or only partly recovered at a low profit or none; liberated fluorine acid has increased difficulties from corrosion of equipment used in the treatment; liberated fluorine acid has actively promoted dissolution of iron-mineral components of phosphate rocks resulting in waste of acid converted to undesirable iron salt remaining in the products; expelled volatile fluorine acid has resulted in losses of fluorine and atmospheric nuisances; and fluorine of the used rock unseparated from the phosphorus has generally remained in resulting phosphatic fertilizers as an undesirable and noxious constituent.

Objects include avoidance of loss of fluorine in acid fumes heretofore generated in treatment of phosphate rock with acids; recovery of fluorine of acid-treated phosphate rock in a separately-recovered valuable fluoride product; avoidance of losses of acid heretofore consumed and wasted in associated formation of a product-contained iron compound; and production of phosphate products of reduced fluorine content and of more value. Other objects appear in the following.

In a mode of practicing the invention in converting phosphate rock to a product of an artificial phosphate, without generation of fluoride vapor and separately recovering the most of the fluorine of the treated phosphate rock in a separated fluoride product, the fluoriferous calcium phosphate constituent of the treated phosphate rock is decomposed with aqueous acid of the above group of acids, and the used aqueous acid solution in action upon the phosphate rock is provided to also contain an added aluminum salt (other than aluminum fluoride which is useless in such treatment), used within certain proportions as hereinafter shown, thereby producing resultant solution containing a substantial portion of the phosphorus rock and the greater proportion of the fluorine of the treated phosphate rock and of the aluminum of the provided and used said salt as co-dissolved aluminum-fluorine compound. The said compound is believed to contain aluminum and fluorine combined within the proportions of for each 27 parts of aluminum from 19 to 57 parts of fluorine, by weight, and more especially within the proportional limits of, for each 27 parts of aluminum, from 28 to 39 parts of fluorine.

In a mode of practicing the invention wherein fluoriferous phosphate rock etc. is treated with and decomposed by application thereto of aqueous acid provided to contain an aluminum salt, the provision and use of a proportional amount of aluminum salt that contains less than about 70 parts of aluminum for each 100 parts of fluorine contained in the treated portion of the phosphate rock, tends to be insufficient to fully suppress formation of fluoriferous fumes and liberation of hydrofluoric and fluosilicic acids, and to fully take the fluorine of the so-treated phosphate rock into the produced solution, and to produce solution then beneficiary containing the most of the fluorine of the treated phosphate rock in chemical combination with aluminum. The use of a proportional amount of aluminum salt providing in excess of 100 parts of aluminum per 100 parts of fluorine in the treated portion of the phosphate rock tends to produce resulting solution containing too much aluminum in other non-fluoride combination than is desirable in the subsequent removal and recovery of both the aluminum of the provided and used aluminum salt and of the fluorine of the so-treated phosphate rock in a valuable product of aluminum and fluorine, as hereinbelow shown.

While phosphate rocks of the used commercial grades usually contain minor proportions of aluminum silicates, so-contained aluminum mineral might be supposed to dissolve in acid solution applied to phosphate rock for decomposition of its fluoriferous tri-calcium phosphate, to provide an effective amount of dissolved aluminum salt to adequately combine with the fluorine of the treated phosphate rock preventing formation of fluoride fumes and liberation of free fluorine acid, but lack of such beneficial results in the prior art, and my researches, indicate that the presence of clayey aluminum silicate in the commercial grades of phosphate rock treated with acid solutions to produce superphosphates, solutions containing phosphoric acid, etc., has not resulted in formation of sufficient aluminum salt to avoid the fluorine-caused losses, difficulties and product-deficiencies heretofore existing in the prior art of utilization of phosphate rock by treatment with solutions of the common mineral acids.

Natural aluminum silicates, such as exits in small proportions in chemical grades of phosphate rocks, are notoriously difficult to decompose at all with solutions of the common mineral acids, such as sulphuric, nitric and hydrochloric acids, and besides, in the application of such acids to phosphate rock for its decomposition, the acidity of the applied acid solution diminishes very rapidly because of immediate and extensive chemical reaction with the calcium oxide of the treated phosphate rock with the result of formation of only a small amount of aluminum salt, if any.

Consequently, because of the insufficient amounts of aluminum minerals in the natural or prepared grades of phosphate rocks selected for chemical conversion to artificial products of phosphorus by treatment of the rocks by applied solutions of acids, and because of the chemical inertness of such minerals in the rock-acid treatment, the novel, useful and beneficial results of this invention, hereinafter set forth, have been absent in the prior art.

My researches indicate that the herein-described use of provided aluminum salt with acid of decomposition of phosphate rock, provides the herein-described results and benefits, which I believe to be both novel and useful, and that the preferred proportional amount of provided and co-used aluminum of aluminum salt for the more economical, beneficial and practical results, is as herein set forth.

However, in the practice of the invention instead of solely determining the optimum proportional amount of aluminum of provided and co-used aluminum salt by mere calculation from the chemical analysis for fluorine in the phosphate rock to be treated and decomposed by the acid of use and the aluminum salt, I prefer to adjust the selected optimum proportion of such use of aluminum of provided aluminum salt as determined by actual test of the process upon a sample of the phosphate rock selected for the use.

In modes of practice of the invention, wherein fluoriferous phosphate rock is treated with acid solution containing a sufficiency of acid to convert substantially all the phosphorus of the rock to phosphoric acid contained in the resulting solution, with co-use in the rock-acid treatment of an aluminum salt provided and used in proportion to result in conversion of the fluorine of the treated phosphate rock to a dissolved aluminum-fluorine compound, I use a proportional amount of acid of treatment sufficient to effect conversion of the calcium of the treated phosphate rock to calcium salt of acid of treatment, as shown below in Examples 1, 2 and 3.

Using such proportional amount of acid of treatment and of provided and used aluminum salt effects conversion of the phosphorus constituent of the treated rock to dissolved phosphoric acid, conversion of the aluminum of the provided and used aluminum salt and fluorine of the treated rock to aluminum-fluorine compound dissolved in the produced solution, and conversion of the calcium of the treated rock to calcium salt of acid of treatment.

Since, however, phosphate rocks ordinarily contain more calcium than the calcium of their tri-calcium phosphate, it is preferred to provide, in aplications of the invention such as shown in Examples 1, 2 and 3, a sufficiency of acid to also convert the other calciferous constituents of the treated rock to calcium salt of acid of treatment.

In the practice of the invention, in the step of conversion of phosphate rock by treatment with solution of the selected acid, and of aluminum salt used in proportion according to the herein-shown, none of the fluorine of the treated phosphate rock forms fluoride fumes or vapors, neither hydrofluoric or fluosilicic acid enters the produced solution, and insoluble fluosilicates are not formed to resule in loss of fluorine left in the solid residues from the treated phosphate rock. Corrosive effects of liberated fluorine acids upon apparatus of treatment, existent in the prior art, are avoided. In the practice of the invention, fluorine of the treated phosphate rock enters the produced solution in combination with the aluminum of the aluminum salt as dissolved aluminum-fluorine compound believed to be of the type of compounds of which $AlF_2OH$, $Al_2F_4SO_4$, $AlF_2NOL_3$, $AlF_2Cl$, $AlF_2(H_2PO_4)_2$ (the acid phosphate of $AlF_2$), and $AlF_2-O-SO_2-O-C_2H_5$, are examples.

In the practice of the invention the proportion of aluminum to fluorine in the so-produced aluminum-fluorine compound is not necessarily in the exact proportion of $Al-2F$ and in some instances the proportion of combined aluminum and fluorine may be somewhat more or less aluminum to fluorine than 27 parts of aluminum per 38 parts of fluorine.

In modes of practice of the invention such as shown in Examples 1, 2 and 3, wherein phosphate rock is treated with the described solution of selected acid and solution of aluminum salt used in proportion according to the herein descriptions, producing solution of aluminum-fluorine compound and containing the phosphorus constituent of the treated rock present as dissolved phosphoric acid, it is preferred to separate the produced solution from the wastable solid residual matter, as by filtration and washing the said matter, and then to recover together the aluminum and fluorine of the separated solution by precipitating and separating therefrom a solid product of aluminum and fluorine, thereby also purifying the separated solution containing the phosphoric acid.

It is especially preferred to jointly recover from said separated solution, the aluminum of the used aluminum salt and the fluorine derived from the phosphate rock by the not obvious addition to said separated solution of more fluorine added to the solution in the form of a fluoride or a plurality of fluorides selected from the group of fluorides which consists of the fluorides of hydrogen (hydrofluoric acid), of silicon (fluosilicic acid and fluosilicates), and of sodium ammonium, calcium and potassium, thereby precipitating from the said separated solution a solid fluoaluminate, for example fluoaluminate of sodium.

For calculation of the required proportional amount of added fluoride precipitant to obtain a desirable fluoaluminate product and a separated solution containing phosphoric acid of low content of aluminum and fluorine, the following exemplary equations have been used $$AlF_2NO_3 + 4NaF = Na_3AlF_6 + NaNO_3$$

$$3AlF_2NO_3 + 2H_2SiF_6 + 9NaNO_3 + 4H_2O = 3Na_3AlF_6 + 2SiO_2 + 12HNO_3$$

$$AlF_2H_2PO_4 + 3NaCl + 4HF = Na_3AlF_6 + 3HCl + H_3PO_4$$

Fluoaluminate precipitates so made and obtained, may contain aluminum and fluorine in proportion different from such proportion in tri-sodium fluoraluminate. For example there may be so precipitated and obtained other fluoaluminate products typified by the formulas $Na_2AlF_5$, $Na_3Al_2F_9$ and $NaCaAlF_6$.

Combinations of fluoride precipitations may be used, in one or more stages. For example, ammonium fluoaluminate may be first produced and removed from the solution, as a product, and after the removal, a sodium salt may then be added to the separated solution, precipitating a further amount of the more insoluble sodium fluoaluminate.

For reasons of economy in cost of fluoride precipitant, in production of relatively insoluble and easily recovered fluoaluminate product, and at the same time denuding the solution containing phosphoric acid of contained aluminum and fluorine, the use of calcium fluoride as precipitant, with co-use of an appropriate sodium salt, such as sodium chloride, nitrate, phosphate or carbonate for example, may provide good economy in provision of fluoride precipitant.

For such use, calcium fluoride is provided and used in very finely particulated form, such as may be obtained by very fine grinding of natural calcium fluoride (fluorspar). In the use of calcium fluoride as precipitant, using as co-precipitant the appropriate amount of a sodium salt, the added calcium fluoride is kept in suspension in the solution to be denuded of aluminum and fluorine until substantial completion of the ensuing reaction. The precipitated fluoaluminate product removed from the purified solution containing phosphoric acid is mostly fluoaluminate of sodium and calcium but not necessarily of the simple formula $NaCaAlF_6$, and may contain less calcium relatively to sodium with similar benefit.

For example, if the solution from which aluminum and fluorine are to be removed, is solution of phosphoric acid and aluminum-fluorine compound, produced from phosphate rock, sulphuric acid and aluminum sulphate as in Example 1, with intention to precipitate and remove aluminum and fluorine as sodium fluoaluminate of some calcium content, sodium carbonate may be added to the solution of phosphoric acid and aluminum-fluorine compound but the sodium carbonate is immediately transformed to acid sodium phosphate. On digestion of the solution with calcium fluoride to precipitate sodium-calcium fluoaluminate, explanatory equations are $$AlF_2H_2PO_4 + NaH_2PO_4 + 2CaF_2 = NaCaAlF_6 + CaH_4P_2O_8$$

$$AlF_2H_2PO_4 + NaH_2PO_4 + 2CaF_2 + 2HNO_3 = NaCaAlF_6 + 2H_3PO_4 + Ca(NO_3)_2$$

In removal and recovery of aluminum and fluorine from solutions containing phosphoric acid and aluminum-fluorine compound produced as shown in Examples 1, 2 and 3, aluminum and fluorine may be together precipitated and removed from the solution in a separate solid product, by use of other precipitants, as for example, precipitating and removing aluminum and fluorine by treatment of the solution with powdered phosphate rock obtaining an impure calcium-phosphorus product enriched in aluminum and fluorine, separated as a solid product from purified solution containing phosphoric acid.

The hereof improvements in use and treatment of phosphate rock etc. for the more efficient and economical production of novel and superior separated products of phosphorus, and of fluorine, are beneficially applicable in the production of phosphoric acid of improved quality by the treatment of phosphate rock etc. with solution of sulphuric acid provided to contain in the treatment the herein-described proportion of aluminum salt. The novel benefits of the invention in production of wet-process phosphoric acid include production of phosphoric acid almost free of noxious compounds of fluorine; elimination of the corrosive effects of liberated acid of fluorine upon the equipment of production of the prior art; total avoidance of the hitherto-present noxious fumes, vapors, etc. generated in the prior art of treatment of phosphate rock with sulphuric acid used to produce phosphoric acid; novel and useful separate recovery of fluorine of the treated phosphate rock etc. in a commercially valuable fluoaluminate product; and other improvements and benefits herein shown.

Example 1.—In an example, producing from fluoriferous phosphate rock a product consisting of solution of phosphoric acid, and a separated solid product of a fluoaluminate, 100 parts of phosphate rock dust of analysis; acid-insoluble 8.5%, CaO 47.8%, $P_2O_5$ 32.8%, and fluorine 3.9%, was treated with solution of sulphuric acid and aluminum sulphate.

To sulphuric acid containing an actual 84 parts of $H_2SO_4$, in strong hot solution there was added and therein dissolved 10 parts of aluminum tri-hydrate, $Al(OH)_3$. To the resulting solution of sulphuric acid and aluminum sulphate the said 100 parts of phosphate rock was added and the mixture was maintained as a hot thick slurry, with stirring, for several hours until the decomposition of the tri-calcium phosphate of the phosphate rock was judged to be complete. No fluoride fumes or vapors were formed at any time and no fluorine acid was liberated in a free state.

(Aluminum tri-hydrate may be technically provided at less cost by use of aluminous minerals, for example, by bauxite.)

After completion of decomposition of the tri-calcium phosphate of the so-used phosphate rock, the produced solution of phosphoric acid and of aluminum-fluorine compound was separated from waste solid matters of gypsum etc. by filtration. I believe that the chemical reactions that occurred may be represented by $$CaCO_3 + H_2SO_4 = CaSO_4 + CO_2 + H_2O$$

$$2(Ca_3P_2F_2O_7.2Ca_3P_2O_8) + Al_2(SO_4)_3 + 15H_2SO_4 + 2H_2O = 18CaSO_4 + 2AlF_2H_2PO_4 + 10H_3PO_4$$

To the combined separated fluid consisting of the filtrate and washings there was added 15.7 parts of sodium fluoride and hydrofluoric acid containing 2.5 parts of actual HF. Cryolite was immediately precipitated and recovered by filtration from the produced solution of phosphoric acid in the amount of 23 parts. The used proportions of sodium fluoride and hydrofluoric acid were computed from $$AlF_2H_2PO_4 + 3NaF + HF = Na_3AlF_6 + H_3PO_4$$

Example 2.—In another example 100 parts of phosphate rock of the above analysis was treated with aqueous nitric and sulphuric acids used together, with co-use of a dissolved aluminum compound. Sulphuric acid was used in the amount containing 38 parts of actual $H_2SO_4$ nitric acid was used in the amount of 55 parts of actual $HNO_3$, and aluminum was provided and used in the amount of 3 parts of Al present as 13.7 parts of basic aluminum nitrate $Al(OH)_2NO_3$.

The amounts used were computed from $$CaCO_3 + H_2SO_4 = CaSO_4 + CO_2 + H_2O$$

$$Ca_3P_2O_8 + H_2SO_4 + 4HNO_3 = 2H_3PO_4 + CaSO_4 + 2Ca(NO_3)_2$$

The decomposition of the phosphate rock and production of solution containing calcium nitrate, phosphoric acid and aluminum-fluorine compound, and formation of undissolved gypsum, was relatively rapid. The aluminum-fluorine compound is believed to be practically represented by the formulas $AlF_2H_2PO_4$ or $AlF_2NO_3$, or partly by each.

There was no liberation of fluoride fumes or vapors and no formation of free hydrofluoric or fluosilicic acid.

The produced solution was separated from the gypsum and waste solid matters by filtration and wasing. To the separated solution and washings combined there was added 28 parts of sodium nitrate and hydrofluoric acid containing the actual amount of 8.9 parts of HF. There was precipitated and recovered from produced solution containing calcium nitrate and phosphoric acid denuded of aluminum and fluorine, 20 parts of crude fluoaluminate of calcium and sodium, as a product.

In the treatment of phosphate rock with nitric and sulphuric acids used together as in this Example 2, the used proportional amounts of nitric and sulphuric acid may be selected to produce a fluorine-free product consisting of fluorine-free solution of calcium nitrate and phosphoric acid having calcium and phosphorus components present in the ratio of $Ca(NO_3)_2 + H_2PO_4$; this is, having calcium and phosphorus present in the atomic ratio of 2Ca:2P. In practicing the mode of the invention using mixed nitric and sulphuric acids, as shown in this example, production of fluorine-free solution of calcium nitrate and phosphoric acid containing calcium and phosphorus present in the said atomic proportion is desirable. If the produced said solution is then to be utilized in making solid fertilizer product, by addition of ammonia, the said atomic proportion is favorable.

Example 3.—In another example the procedure differs from that of Example 2, in that more nitric acid and less sulphuric acid in proportion are applied in such treatment of phosphate rock, with choice of the acid proportions so that the resulting solution of calcium nitrate and phosphoric acid after being denuded of aluminum and fluorine as herein described, contains calcium nitrate and phosphoric acid in the proportion of $3Ca(NO_3)_2 + 2H_3PO_4$, that is to say, containing calcium and phosphorus in the atomic proportion of 3Ca:2P.

So produced solution of calcium nitrate and phosphoric acid, denuded of aluminum and fluorine, as herein-described, of the latter said atomic calcium-to-phosphorus proportion, is well suited for use as direct-application fertilizer solution, either used alone or used in make-up of more complete fertilizer solution by addition of ammonium nitrate, potassium chloride, urea, etc.

The invention may also be practiced treating fluoriferous phosphate rock with solution of nitric acid used alone and without use of sulphuric acid, but inasmuch as aluminum salt provided and used as herein-described, is generally more economically providable as aluminum sulphate, in the treatment of phosphate with nitric acid alone, it is preferred that the aluminum salt provided and used in the treatment, is aluminum sulphate. The use of aluminum sulphate has the advantage that gypsum is formed in the rock-acid treatment, and the formed gypsum improves the filterability of the produced solution, and with production of slime-free clear filtrate.

In the practice of the invention, solution of aluminum sulphate to be so provided and used as herein set forth, is obtainable by the dissolution of bauxite etc. in hot strong sulphuric acid solution. The so-produced solution of sulphuric acid, more or less mixed with inert undissolved constituents of the bauxite etc. may be used with convenience for the purpose of supply and provision of aluminum salt for the herein-described uses.

For the generally most economical provision of aluminum sulphate for the herein-described use, aluminous phosphate mineral, raw or calcined, may be treated with solution of sulphuric acid producing solution containing both aluminum sulphate and phosphoric acid, the latter increasing the yield of phosphoric acid contained in the so-produced defluorinated solution containing phosphoric acid of both the said used mineral sources.

The following describes application of the invention in joint utilization of aluminous phosphate mineral and phosphate rock etc. in production of a product of phosphorus and a separated product of fluorine.

Aluminous phosphate mineral has been heretofore wasted in very large amounts at phosphate mining establishments, and where elsewhere occurring has not generally been economically usable, notwithstanding substantial value of both alumina and phosphorus therein.

It is a further object to obtain useful products of phosphorus from said mineral used in part and from co-operatively utilized fluoriferous phosphate rock used in part, of which porducts the phosphorus is derived from both said mineral and said rock, while usefully effecting chemical conversion of aluminum of said mineral and fluorine of said rock to a solid product largely of aluminum and fluorine. It is also an object, in making a product of phosphorus from aluminous phosphate mineral as source in part of product-contained phosphorus, to obtain reciprocally useful benefits from the use of each of said sources in utilization of the other source.

And in a particular mode of application of the invention co-utilizing aluminous phosphate mineral and fluoriferous phosphate rock as sources of product-contained phosphorus, with use of sulphuric acid as chemical agent of solubilization of the phosphorus of both sources, it is an object to usefully obtain as products (a) solution of phosphoric acid and (b) a solid product mostly composed of aluminum and fluorine.

In application of the invention wherein both aluminous phosphate mineral and phosphate rock etc. are used in making a product consisting of solution containing phosphoric acid whereof the phosphorus is derived from both said mineral and said rock, and making a separate solid product consisting largely of aluminum derived from said mineral and fluorine from said rock, the used mineral is treated with solution of sulphuric acid for solubilization and extraction of both phosphorus and aluminum. The proportional amount of acid used is a proportion sufficient to result in dissolution and extraction of a high percentage of the mineral-contained phosphorus, such as 85% or more, but unavoidably as heretofore in the art also dissolving and extracting a large proportion of the alumina of the mineral then present as an aluminum salt in the extracted solution containing the phosphoric acid. In the prior art such extraction of a large proportion of the alumina contained in most aluminous phosphates has been an impediment in the utilization of the mineral because of lack of practical means to utilize either of said solution constituents in the presence of the other, with the result of enormous waste of the aluminous phosphate minerals at phosphate mine operations. But in this application of the invention below described, recovering both the phosphorus and the alumina which are together dissolved in large amounts when the mineral is treated with acid, and especially when treated with sulphuric acid, there are obtained the novel results and benefits appearing in the below.

In the application of the invention, producing phosphoric acid from aluminous phosphate mineral and phosphate rock as sources of the phosphorus of the phosphoric acid, the following steps are used.

In a step, solution of phosphoric acid, aluminum sulphate etc. is produced by treating aluminous phosphate mineral with sulphuric acid, but separation of the produced solution from gypsum and other solid matters may be deferred.

Being then provided with the resulting solution of phosphoric acid and aluminum sulphate containing most or all of the fluorine of the mineral, as well as any unused excess of sulphuric acid, the resulting solution is mixed and chemically reacted with finely ground phosphate rock with use of a total amount of sulphion ($SO_4$), in sufficient proportion to convert all of the CaO of the treated phosphate rock to calcium sulphate. If a less proportion of sulphuric acid is provided in the reacted mix of solution and phosphate rock, alumina precipitates out and the resulting solution contains less or no alumina, but instead wasted with the other insoluble constituents of the resulting mix when the solution is recovered by filtration.

The mix of said solution of phosphoric acid, aluminum sulphate etc. and the thereto added phosphate rock is digested, preferably with heating, until the respective constituents of the fluoriferous tri-calcium phosphate of the rock are substantially converted to calcium salt dissolved phosphoric acid and aluminum-fluorine compound.

The computation of the proportion of phosphate rock and thereto applied solution of phosphoric acid, aluminum sulphate, etc. produced as above described uses the chemical analysis of the phosphate rock and of the solution so-obtained by the treatment of the aluminous phosphate mineral with acid, as shown in the examples. In production of phosphoric from both of the said mineral sources, the proportions are preferably selected so that for each 10 parts of alumina present in the mix of phosphate rock and the so-applied said solution, the total amount of fluorine present in both the used phosphate rock and the said solution thereto applied, is 7 parts or thereabout, by weight:

Example 4.—In this example, producing phosphoric acid from aluminous phosphate mineral and from phosphate rock as sources of its phosphorus, and making a product of aluminum and fluorine whereof the aluminum is substantially derived from the said mineral and the fluorine is derived from both the said mineral and the said rock, aluminous phosphate mineral is treated with solution of sulphuric acid, producing a slurry consisting of gypsum and other wastable solid matters suspended in resulting solution of phosphoric acid, aluminum sulphate, more or less sulphuric acid, and aluminum-fluorine compound. The solid substances in the slurry take no important part, if any, in the below-described utilization of the solution component of the slurry and may be disregarded as a mere solid diluent to be subsequently wasted along with other wastable solid matters from the next-to-be-used phosphate rock.

The solution component of the slurry contains $P_2O_5$ 11.2%; fluorine 1.05%; aluminum sulphate in the amount which contains $Al_2O_3$ 4.5% and total sulphion $SO_4$ equivalent to 21% of $H_2SO_4$. The to-be-used phosphate rock contains CaO 49.4%; $P_2O_5$ 33.6%; and fluorine 3.7%.

There is taken of the slurry from the treatment of the aluminous phosphate mineral, the amount which contains 100 parts of the said solution component of the slurry and there is added thereto 64.9 parts of the phosphate rock and a further amount of sulphuric acid containing 34.8 parts of actual $H_2SO_4$ (being the further amount of sulphuric acid necessary to convert all calcium of the mix to calcium sulphate), and the whole mixed and digested until substantial completion of the chemical reactions therein. The resulting solution of phosphoric acid and aluminum-fluorine compound is then separated from the solid matters by filtration.

11.5 parts of commercial precipitated sodium fluosilicate is decomposed by digestion in solution of ammonia resulting in solution of sodium and aluminum fluorides being formed, representable by $$Na_2SiF_6 + 4NH_3 \rightarrow 2NaF + 4NH_4F + SiO_2$$

The produced solution is separated from the formed silica by filtration.

8 parts of sodium carbonate is added to the above said solution of phosphoric acid and aluminum-fluorine compound, followed by the addition of the so-produced solution of sodium and ammonium fluorides. Crude cryolite is immediately precipitated and recovered as a product in the amount of 18 parts, by filtration. The following is explanatory

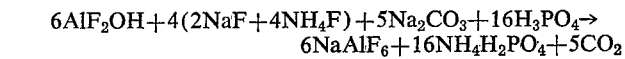

The solution of phosphoric acid separated from the cryolite by filtration, is a product.

Example 5.—In this example, aluminous phosphate mineral is treated with and its principal constituents decomposed by solution of sulphuric acid. Nitric acid is also used, either with sulphuric acid in the treatment of the mineral by solution of sulphuric acid, or added to the solution resulting from treatment of the mineral with sulphuric acid alone. The amount of sulphuric acid used is the amount required to convert the calcium oxide of the mineral to solid calcium sulphate without use of an overage of sulphuric acid beyond the amount usable to produce resulting solution of the analysis $P_2O_5$ 10%; fluorine 1.05%; $Al_2O_3$ 5% present as aluminum sulphate, and free $H_2SO_4$ 5%. The content of nitric acid in the so-obtained solution is adjusted to amount to 5% $HNO_3$.

The to-be-used phosphate rock contains CaO 49.4%; $P_2O_5$ 33.6%; and fluorine 3.7%.

Computation shows, with use of the amount of the slurry containing 100 parts of the solution of said analysis, to produce a subsequent mix of slurry and phosphate rock containing 4 parts of $Al_2O_3$ for each 3 parts of fluorine, that 73 parts of the phosphate rock are required. To the amount of the slurry containing 100 parts of its solution content, there is added 73 parts of the powdered phosphate rock together with a further 16 parts of sulphuric acid $H_2SO_4$ and the further amount of nitric acid containing 55 parts of $HNO_3$.

After the reaction upon the phosphate rock is adjudged to be substantially complete, there is separated from the solid matters, by filtration and wash-out, solution of calcium nitrate, phosphoric acid and aluminum-fluorine compound containing the fluorine of both the used mineral and the phosphate rock and a substantial part of the aluminum of the used aluminous phosphate mineral.

The aluminum and fluorine are then removed from the latter solution in a product mostly of a fluoaluminate, as elsewhere herein shown. The defluorinated solution of calcium nitrate and phosphoric acid is also a product.

In the invention, in treatment of phosphate rock with solution of an acid and an aluminum salt, hydrochloric acid can be successfully used, and with advantage if the cost of the acid is sufficiently low. The results obtained with hydrochloric acid are analogous to the results with nitric acid when an equimolar amount of hydrochloric acid is substituted for nitric acid, for example as shown in Examples 2 and 3. The produced solution with such substitution of nitric acid by hydrochloric acid, contains phosphoric acid and aluminum-fluorine compound, and calcium chloride instead of calcium nitrate.

Amidosulphonic acid can be used in treatment of phosphate rock according to the foregoing, producing solution containing calcium amidosulphonate and phosphoric acid. This acid should be applied to phosphate rock unheated to restrain premature hydrolytic decomposition. Resultant solution of calcium amidosulphonate and phosphoric acid can then be heat-treated decomposing the calcium amidosulphonate into precipitated calcium sulphate and solution-contained ammonium sulphate.

In the invention, methyl-, ethyl-, propyl- and butyl-sulphuric acids, being strong monobasic acids which form soluble calcium salts, can be used in treatment of phosphate rock by their solutions also containing an aluminum salt, analogously to the use of nitric acid, any of the said alkyl acids being replaced for nitric acid in equimolar proportion.

Using, for example, ethyl-sulphuric acid obtained by absorption of ethylene in strong sulphuric acid, replacing 1 part of nitric acid as described above, by 2 parts of ethyl-sulphuric acid, results analogous to the results obtained by use of nitric acid are obtained. After removal of aluminum and fluorine as above described by heat treatment of the resultant solution the calcium ethyl-sulphate is hydrolytically decomposed producing boiled-out and condensed ethyl-alcohol as a product, and precipitating clean calcium sulphate as a product separable by filtration from the final solution containing the phosphorus derivative of the treated phosphate rock.

The herein sometimes used formula for apatite $$Ca_3P_2F_2O_7 \cdot 2Ca_3P_2O_8$$

represents tri-calcium phosphate times 3, wherein one oxygen is replaced by 2F, analogous to many such replacement in fluo acids. In some instances for simplicity the common formula $Ca_3P_2O_8$ is used.

In the practice of the invention using sulphurous acid as decomposant of phosphate rock.

In the practice of the invention wherein phosphate rock etc. is utilized in extraction of $SO_2$ from a gas stream from combustion, $SO_2$ is extracted from the gas stream by an aqueous gas-treating medium containing a chemically-reacting aluminum compound. There is used a phosphate mineral of the group which consists of raw or calcined phosphate rock, apatite and aluminous phosphate mineral.

It has been previously proposed to treat phosphate rock with sulphurous acid or with water solution of $SO_2$ extracted from bubbled-through streams of gases containing $SO_2$ and to thereby convert the calcium phosphate component of the phosphate rock to chemical products of phosphorus. Such proposals have not been technically applied with success. The resistance of fluophosphate minerals to single chemical attack by relatively weak sulphurous acid, is too great to permit success. I have found that the resistance of phosphate rock to chemical decomposition with sulphurous acid is decreased by the presence of an aluminum salt in the sulphurous acid solution applied to the rock.

In the practice of this invention treating phosphate rock with a formed solution containing sulphurous acid in the presence of a reactible aluminum compound, the phosphate rock used should be very finely particulated and may be used in an aqueous suspension or slurry through which a stream of gas from combustion and containing gaseous $SO_2$ is bubbled, or such slurry may be trickled down a tower packed with open tower packing as done in many gas treatments in well-known chemical processes, leading the gas stream upwardly through the tower packing.

In the practice of the invention the used medium may be water, initially, or may be solution of an aluminum salt, or may be a suspension of pulverized chemically-reactive aluminate such as is obtained, for example, by furnacing and sintering a mixture of sodium carbonate and an aluminous mineral such as bauxite, clay, and high-alumina coal ash etc.

Objects of the invention further include, to enable extraction and recovery of sulphur dioxide from sulphurous gas streams from combustion, with economic benefits offsetting the cost of gas treatment and cleaning; to utilize the good $SO_2$ absorption capability of solutions containing aluminum sulphite in the conversion of phosphate rock etc. to a useful artificial product of phosphorus; and to better clean $SO_2$-containing gas streams by use of an absorption train wherein the exiting gas stream is brought into contact with an absorption medium having an alkaline chemical reaction.

Other objects appear herein.

In the recovery of $SO_2$ from a weak gas stream, the used aluminous compound is selected from the group of aluminous materials which includes, but without limitation, aluminum hydroxide, sulphate, sulphite, chloride, and basic chloride, alkali metal aluminates, calcium aluminate and natural or artificial aluminum phosphate.

In the practice of the invention wherein $SO_2$ is recovered from gas streams, the gas stream to be treated to extract $SO_2$ therefrom, is brought into contact with an aqueous fluid medium containing a selected aluminous substance. In the practice of the invention, combining recovery and utilization of the $SO_2$ constituent of the gas stream from combustion of sulphurous fuels etc., with contingent utilization of phosphate rock etc. to be converted to a more useful and valuable artificial product of phosphorus, the use of the aluminous substance as component of the gas-treating medium, is plurally useful and beneficially advantageous in that (1) its use enables improves resulting sulphite concentration build-up in the used medium, (2) because of chemical affinity of aluminum of the medium and fluorine of the phosphate rock etc. its use energizes the chemical decomposition of the refractory fluoriferous calcium phosphate of the rock, (3) its use optionally enables the production and recovery of a valuable by-product containing aluminum and fluorine, and (4) its use tends to prevent the corosive and nuisant-creating effects of fluorine acids heretofore liberated in acid treatment of phosphate rocks, and (5) in the invention, the use of a reactible aluminum compound having an alkaline reaction when wetted, such as the herein-shown use of sodium aluminate used in make-up of the aqueous fluid medium of absorption of $SO_2$ from a gas stream, provides further novelty and utility as set forth in the next-below.

In the use of an aluminate of alkaline reaction when wetted, and using the medium of absorption of $SO_2$ in a countercurrent train of absorption equipment in which the gas stream is passed countercurrent to the flow of the absorption medium, there is enabled a much better percentage of extraction and a much better cleaning of the gas stream than results in absorbing system where the gas passes from the train in contact with a medium of an acid reaction.

Any known absorption system and apparatus for gas washing, scrubbing, tower-absorbing, percolating, gas injection, countercurrent treatments etc. may be used in treating a sulphurous gas stream with the herein-described aqueous fluid medium.

The so-used aluminous substances may be introduced into the absorbing medium either in dissolved or directly soluble form, as in the use of aluminum sulphate, aluminum sulphite etc., or in a form dissoluble in the medium by action thereon of sulphurous acid, as in the use of aluminum hydroxide, calcium aluminate, natural or artificial aluminum phosphate, or crude solid powdered alkali metal aluminate.

Example 6.—In this practice of the invention, the used phosphate rock etc., preferably pre-calcined to oxidize and remove its refractory carbonaceous constituent, and as finely pulverized as commercially practicable, optionally (A) may be introduced and used as an original constituent of the medium containing a selected aluminous substance used in the $SO_2$ absorption, (B) medium containing the aluminous substance but not the phosphate rock etc. may be used as absorbent of $SO_2$ from a gas stream, the dissolved $SO_2$ entering into chemical combination with the aluminous constituent as dissolved aluminum sulphite or persulphite. By the term "persulphite" is meant sulphite of aluminum containing more $SO_2$ proportionally to $Al_2O_3$ than is contained in the theoretical neutral aluminum sulphite $Al_2O_3 \cdot 3SO_2$.

Under option (B), solution of sodium aluminate (or its equivalent, a mix of water and powdered crude solid sodium aluminate) is used as fluid medium of absorption of $SO_2$ from a sulphurous gas stream, producing solution containing sodium bisulphite and aluminum persulphite, as may be illustrated by

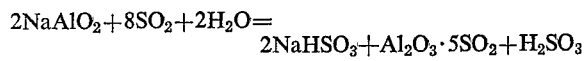

$$2NaAlO_2 + 8SO_2 + 2H_2O = 2NaHSO_3 + Al_2O_3 \cdot 5SO_2 + H_2SO_3$$

Under option (B), to the resulting sulphited medium containing aluminum persulphite and preferably some free sulphurous acid, the selected proportion of phosphate rock is then added, and the whole maintained and digested for completion of chemical reaction of the components of the resulting medium. For a more complete chemical conversion of components of the resulting medium, concentrated $SO_2$ gas may be subsequently injected into the medium under pressure.

The crude product of use of phosphate rock in absorbing $SO_2$ from a gas stream containing $SO_2$, under either option, is a suspension of solids including calcium sulphite, artificial calcium phosphate and aluminum-fluorine compound in water or in solution containing sulphurous acid and an artificial calcium phosphate.

Options (A) and (B) may each be used in part.

For purposes of explanation of conversion of phosphate rock to calcium sulphite and an artificial calcium phosphate, with use of $SO_2$, assuming, for the sake of simplicity that the phosphate rock is chemically represented by the formula

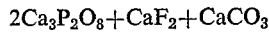

$$2Ca_3P_2O_8 + CaF_2 + CaCO_3$$

the following is explanatory

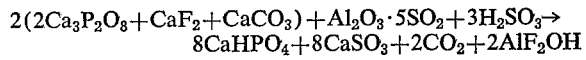

$$2(2Ca_3P_2O_8 + CaF_2 + CaCO_3) + Al_2O_3 \cdot 5SO_2 + 3H_2SO_3 \rightarrow 8CaHPO_4 + 8CaSO_3 + 2CO_2 + 2AlF_2OH$$

The solids separated from the suspension by filtration, etc. constitute an example of a new agricultural superphosphate.

By the term "superphosphate" is meant a solid product containing an artificial calcium phosphate and also containing unremoved non-phosphoric solid constituents characteristically contained in phosphate rocks, such as sand and clay, resulting from treatment of powdered phosphate rock with acid of the group of acids which consists of sulphuric, sulphurous and phosphoric acids.

An advantage of selecting option (B) is the use of solution as absorbent uncomplicated by need of means to maintain phosphate rock in suspension in the medium during the absorption of $SO_2$, and an advantage is selecting option (A) is to obtain a somewhat greater absorption of $SO_2$.

Example 7.—In an example, absorbing $SO_2$ from a gas stream, there is used as medium of absorption, a fluid suspension made from 100 parts finely powdered phosphate rock of grade commonly selected for chemical conversion to a superphosphate, or to solution of phosphoric acid, 225 parts of water and freshly prepared aluminum hydroxide used in the amount which contains 9 parts of $Al_2O_3$. The medium is used in absorption of $SO_2$ from a gas stream containing a few percent of $SO_2$. There is absorbed 21 parts of $SO_2$, by weight.

The product of the absorption may be then further treated for chemical transformation into a product of phosphorus, sulphur, and together-combined aluminum and fluorine, with acidic substance selected from the group of substances which comprises chlorine, concentrated $SO_2$ gas applied under pressure, nitric acid, hydrochloric acid, sulphuric acid, and phosphoric acid, used singly or in a selected combination.

Example 8.—In an example (a) of treatment of the crude mass resulting from the hereindescribed absorption of $SO_2$ in a medium supplied with phosphate rock, the crude product from the described absorption of $SO_2$ is placed in a closeable pressure-resisting container and treated with forced in concentrated $SO_2$ gas under pressure, the $SO_2$ reacting with any remaining unreacted phosphate rock and already-formed dicalcium phosphate constituent, according to reactions such as

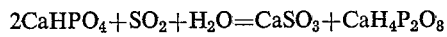

$$2CaHPO_4 + SO_2 + H_2O = CaSO_3 + CaH_4P_2O_8$$

The solution containing sulphurous acid and monocalcium phosphate is recovered as a product for further suitable treatment.

Example 9.—In an example (b) of treatment of the mass resulting from the herein-described absorption of $SO_2$ from a gas stream in a hereindescribed medium of absorption, sulphuric acid is added to the resulting said mass, using the proportion of the acid just sufficient to combine with all calcium present for conversion to calcium sulphate, resulting in a solution of phosphoric acid and aluminum-fluorine compound, separated from wastable gypsum and dirt, for further treatment of the solution as above herein shown, and a product of expelled concentrated $SO_2$ gas.

Example 10.—In an example (c) of treatment of said mass resulting from the absorption of $SO_2$ from a gas stream, the absorbing medium is prepared by intermingling 100 parts of chemical grade phosphate rock in solution of basic aluminum chloride $Al(OH)_2Cl$ in the amount to provide 3 parts of aluminum (element). 14 parts of $SO_2$ are absorbed. Into the product from the absorption there is introduced the amount of chlorine computed to be the amount required to convert the sulphite constituent of the mass to the respective sulphate, forming calcium chloride from the chlorine, the amount required being about 15 parts of chlorine. The product is a suspension of solids including dicalcium phosphate, calcium sulphate and aluminum-fluorine compound. The solids are separated from the solution of calcium chloride and the separated mass constitutes a novel superphosphate usable in fertilizing land.

In a modification of example (c) 28 parts of $SO_2$ are absorbed, and the amount of chlorine used is approximately 32 parts. A product consisting of solution of phosphoric acid, calcium chloride and aluminum-fluorine compound, is separated from the calcium sulphate formed, by filtration.

Example 11.—In an example (d) of use of nitric acid to further usefully convert an above-described mass resulting form the above-shown absorption of $SO_2$ from a gas stream, with absorbing medium consisting of a suspension of 100 parts of chemical grade phosphate rock in solution of a fluorine-acceptive aluminum compound present in the amount to provide 3 parts of aluminum (element), there is absorbed from a gas stream 21 parts of $SO_2$. To the product of absorption there is added the amount of acids which contains 14 parts of $HNO_3$ and 54 parts of $H_2SO_4$. The nitric acid is decomposed forming expelled gaseous oxide of nitrogen as a product and all sulphites present converted to the sulphates.

The formed solution of phosphoric acid and aluminum-fluorine compound is separated from the formed calcium sulphate by filtration, and treated for removal of aluminum and fluorine as hereinbefore shown producing solution of phosphoric acid as a product and a separated solid product largely composed of aluminum and fluorine.

Example 12.—In an example of production of a novel crude superphosphate essentially composed of dicalcium phosphate, calcium sulphate, calcium sulphite and an aluminum-fluorine compound, there is used as medium for absorption of $SO_2$ from a gas stream, a suspension of 100 parts of finely pulverized phosphate rock of the last-above analysis of phosphate rock, 20 parts of aluminum sulphate $Al_2(SO_4)_3$ and 200 parts of water, 20 parts of $SO_2$ are absorbed from a gas stream by the said medium. The resulting product of absorption is digested with heating in a closed pressure-resisting container, converting the product to a suspension of solids separated and recovered as a novel agriculturally-useful superphosphate.

Example 13.—In an example, bauxite is furnace-treated with sodium carbonate producing crude sodium aluminate. The sodium aluminate is pulverized and disposed in water and the dispersion used as medium of absorption of sulphur dioxide from a gas stream with the favorable alkalinity of the medium improving the absorption, as compared to use of an absorbing medium of neutral or acid condition, if the gas stream is moved counter-currently of the movement of the medium. There is produced solution of sodium bisulphite and aluminum persulphite, for example according to $$2Na_3AlO_3 + 11SO_2 \rightarrow 6NaHSO_3 + Al_2O_3 \cdot 5H_2O$$

To the resulting medium containing said acid sulphites, there is added the amount of pulverized phosphate rock calculated from the below equation, the mix is placed in a closed pressure-resisting container with a valved $SO_2$ outlet pipe and sulphuric acid forced in effecting chemical reaction, decomposition and conversion explainable by $$6NaHSO_3 + Al_2O_3 \cdot 5SO_2 + 2Ca_9P_6F_2O_{23} + 18H_2SO_4 \rightarrow$$
$$6NaH_2PO_4 + 18CaSO_4 + 6H_3PO_4 + 2AlF_2OH + 11SO_2$$

solution containing phosphoric acid and aluminum-fluorine campound results and gaseous $SO_2$ is led off and liquefied to a product, and solution of phosphoric acid and precipitated sodium fluoaluminate result. The solution is further processed for a product of solution of phosphoric acid and a fluoaluminate product.

Herein by the term "aluminum persulphite" etc. is meant a solution-contained sulphite of aluminum containing more $SO_2$ in proportion to $Al_2O_3$ than is contained in theoretical $Al_2O_3 \cdot 3SO_2$ By persulphite of a common alkali metal is meant a sulphite, for sodium for example, containing more $SO_2$ relatively to $Na_2O$ than is contained in the normal sodium sulphite $Na_2O \cdot SO_2$.

In the claims by phosphate rock it is meant to include phosphate rock in the natural state as produced by mining, phosphate rock which has been burned or calcined, phosphate rock concentrate in the natural state or calcined, and apatite concentrate and the like.

In the claims by common strong base it is meant to include the bases of sodium and potassium.

I claim:

1. Process of acid-treating fluoriferous calcium phosphate rock and converting the phosphorus constituent of the rock to the phosphorus component of an artificial phosphate product and converting the fluorine constituent of said rock to a compound of aluminum and fluorine, which process comprises treating the phosphate rock with solution of acid selected from the group of acids which consists of sulphuric, hydrochloric, nitric and amidosulphonic acids, and alkyl-sulphuric acids the latter of molecular weight less than 146, using in the treatment of the phosphate rock a sufficient proportion of acid of treatment to substantially complete the decomposition of said fluophosphate and to complete the conversion of the phosphorus of the phosphate rock to the phosphorus component of an artificial phosphate, providing in the acid solution of treatment of the phosphate rock, in the treatment, a fluorine-acceptive salt of aluminum of other source of its aluminum than the treated phosphate rock, using said salt in the treatment of the phosphate rock in proportion substantially sufficient to complete the conversion of the fluorine of the treated phosphate rock to a compound of aluminum and fluorine, and thereby obtaining a product consisting of solution containing fluorine and the phosphorus of the used phosphate rock present in said product respectively as phosphoric acid and in an aluminum-fluorine compound.

2. The process of producing from fluoriferous calcium phosphate rock, a product consisting of solution of which phosphoric acid is the principal phosphoric constituent, and obtaining a separate product of chemically-combined aluminum and fluorine, which process comprises treating and decomposing the phosphate rock with thereto applied solution of acid selected from the group of acids which consists of sulphuric, hydrochloric, nitric and amidosulphonic acids, and of alkyl-sulphuric acids the latter of molecular weight less than 146, using in the treatment of the phosphate rock a proportional amount of acid of treatment sufficient to substantially convert the calcium of the treated phosphate rock to calcium salt of acid of treatment, and using in the same treatment of the phosphate rock, the proportional amount of an aluminum-containing solution-dissoluble substance sufficient to provide in the solution of treatment of the phosphate rock more than one-half part of dissolved fluorine-acceptive aluminum, by weight, for each part of fluorine in the treated portion of the phosphate rock, thereby producing resultant solution containing the phosphorus of the treated phosphate rock in the form of phosphoric acid and also containing a dissolved fluorine-aluminum compound whereof its fluorine is derived from the treated phosphate rock, and precipitating aluminum and fluorine together from the resultant solution in a solid product of chemically combined aluminum and fluorine separated from a product consisting of solution whereof phosphoric acid is a principal constituent.

3. As claim 2, wherein there is used as precipitant of aluminum and fluorine, a fluoride selected from the group of fluorides which consists of the fluorides of hydrogen, sodium, ammonium, potassium and calcium.

4. The process of producing from fluoriferous calcium phosphate rock, a product which consists of solution whereof phosphoric acid is the principal phosphorus constituent, and obtaining a solid product of chemically-combined aluminum and fluorine separated from said solution product, which process comprises treating and chemically decomposing the phosphate rock with thereto-applied solution of acid selected from the group of acids which consists of sulphuric, hydrochloric, nitric and amidosulphonic acids, and of alkyl-sulphuric acids the latter of molecular weight less than 146, using in the treatment of the phosphate rock a proportional amount of acid of treatment sufficient to substantially convert the calcium of the treated phosphate rock to the calcium constituent of a salt of calcium other than a phosphate and to substantially convert the phosphorus of the treated phosphate rock to phosphoric acid, said solution used in the treatment of the phosphate rock supplied with and containing in the treatment of the phosphate rock a fluorine-acceptive aluminum salt in the proportion containing more than one-half part of aluminum of the salt, by weight, for each part of fluorine contained in the treated portion of the phosphate rock, thereby producing resultant solution containing the phosphorus of the treated rock principally therein present as phosphoric acid, said resultant solution also containing of the fluorine of the treated phosphate rock and present therein as a component of a dissolved aluminum-fluorine compound, and then precipitating together both aluminum and fluorine from said resultant solution, by means of addition thereto of a fluoride precipitant, in the form of a solid product of aluminum and fluorine contained in a solid precipitated product separated from a product consisting of a solution containing the phosphorus of the treated phosphate rock therein present as phosphoric acid.

5. The process of claim 4 wherein there is used as precipitant of aluminum and fluorine, a fluoride selected from the group which consists of the fluorides of hydrogen, sodium, ammonium, potassium and calcium.

6. The process of producing from fluoriferous calcium phosphate rock a product consisting of solution of which phosphoric acid is the principal phosphorus constituent, and obtaining a separated solid product of chemically-combined aluminum and fluorine, which process comprises treating and decomposing said rock with thereto-applied solution of acid selected from the group of acids which consists of sulphuric, hydrochloric, nitric and amidosulphonic acids, and alkyl-sulphuric acids the latter of molecular weight less than 146, using in the treatment of said rock a proportional amount of acid of treatment sufficient to substantially complete the conversion of the calcium of said treated rock to calcium salt of acid of treatment and the conversion of the phosphorus of said treated rock to phosphoric acid, said acid solution used in the treatment of said rock supplied with and provided to contain fluorine-acceptive aluminum salt of source of its aluminum other than said rock, and so supplied and used in the proportional amount of between ½ and 1½ weight units of aluminum for each weight unit of fluorine in the treated portion of said rock thereby producing solution of phosphoric acid and of aluminum-fluorine compound whereof its fluorine is derived from said treated rock and whereof aluminum is derived from said used salt, and then precipitating from the resultant solution, by means of addition of a fluoride a solid product of aluminum and fluorine, separated from a product which consists of solution containing the phosphorus of said treated rock therein present as phosphoric acid.

7. The process of claim 6 wherein the used acid is sulphuric acid and the used aluminum salt is aluminum sulphate, and the made primary solution is solution of phosphoric acid and of an aluminum-fluorine compound, and wherein from the said primary solution, aluminum and fluorine are co-precipitated and removed by precipitation as a solid fluoaluminate product separated from solution of phosphoric acid as a product.

8. The process of producing from fluoriferous calcium phosphate rock a product which consists of solution of calcium nitrate and phosphoric acid and a separated solid product of an aluminum-fluorine compound, which process comprises treating and decomposing said rock with thereto-applied solution containing nitric acid, said solution of treatment of the phosphate rock provided to contain in said treatment of the rock a proportional amount of a fluorine-acceptive aluminum salt sufficient to provide at least one-half part of aluminum of the salt, by weight, for each part of fluorine contained in the treated portion of said rock, and using in the treatment of the rock a sufficient proportion of acid of treatment to substantially complete the conversion of the calcium of said treated rock to calcium salt other than phosphate, and thereby producing solution of calcium nitrate, phosphoric acid and of an aluminum-fluorine compound whereof the fluorine is principally derived from said treated rock and aluminum derived from the said used salt, and then precipitating from the latter said solution by addition thereto of a fluoride as the precipitant, a precipitated solid product of aluminum and fluorine separated from a product consisting of solution mainly of calcium nitrate and phosphoric acid.

9. The process of claim 8 wherein the used aluminum salt is aluminum sulphate.

10. In the process of making solution of phosphoric acid as a product and making a solid product of chemically combined aluminum and fluorine, from aluminous phosphate mineral and from fluoriferous calcium phosphate rock as sources of the phosphorus of said solution, and from said mineral and said rock as the principal sources of the aluminum and fluorine of said solid product, the improvement which comprises treating and decomposing constituents of said mineral with thereto-applied solution of sulphuric acid and thereby obtaining solution whereof aluminum sulphate and phosphoric acid are the essential solutes, and mixing and chemically reacting the latter said solution with phosphate rock in such proportion of mixing as to provide in the mix more than one total weight unit of $Al_2O_3$ for each weight unit of fluorine in the mix, reacting the components of the mix producing solution of phosphoric acid and of aluminum-fluorine compound and then precipitating from said latter solution a solid product of aluminum and fluorine separated from a product consisting of solution of phosphoric acid.

References Cited

UNITED STATES PATENTS

| 2,769,703 | 11/1956 | Andres et al. | 71—37 X |
|---|---|---|---|
| 2,783,140 | 2/1957 | Hignett et al. | 71—37 |
| 1,475,156 | 11/1923 | Howard | 23—88 |
| 1,475,158 | 11/1923 | Howard | 23—88 |
| 1,850,017 | 3/1932 | Lehrecke | 23—88 |
| 1,524,472 | 1/1925 | Betts | 23—88 |
| 1,598,672 | 9/1926 | Betts | 23—88 |
| 1,872,716 | 8/1932 | Finkelstein et al. | 23—88 |
| 2,031,554 | 2/1936 | Torchet | 23—88 |
| 2,186,433 | 1/1940 | Schwemmer | 23—88 |
| 2,636,806 | 4/1953 | Winter | 23—88 |
| 2,954,275 | 9/1960 | Carothers et al. | 23—88 |
| 2,996,355 | 8/1961 | Kamlet | 23—88 |
| 3,031,262 | 4/1962 | Rosenbloom | 23—88 |
| 3,058,803 | 10/1962 | Hinkle Jr., et al. | 23—88 |
| 3,065,051 | 11/1962 | Mader | 23—88 |
| 3,128,151 | 4/1964 | Zanon et al. | 23—88 |

OSCAR R. VERTIZ, Primary Examiner

G. O. PETERS, Assistant Examiner

U.S. Cl. X.R.

23—92, 107, 165